United States Patent
Gaither et al.

(10) Patent No.: US 10,762,011 B2
(45) Date of Patent: *Sep. 1, 2020

(54) REFLECTIVE MEMORY BRIDGE FOR EXTERNAL COMPUTING NODES

(71) Applicant: HEWLETT PACKARD ENTERPRISE DEVELOPMENT LP, Houston, TX (US)

(72) Inventors: Blaine D Gaither, Fort Collins, CO (US); Robert J Brooks, Fort Collins, CO (US); Benjamin D Osecky, Fort Collins, CO (US); Kathryn A Evertson, Fort Collins, CO (US); Andrew R Wheeler, Fort Collins, CO (US); David Fisk, Carrollton, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/880,493

(22) Filed: Jan. 25, 2018

(65) Prior Publication Data

US 2019/0138466 A1  May 9, 2019

Related U.S. Application Data

(63) Continuation-in-part of application No. 14/389,910, filed as application No. PCT/US2012/035904 on Apr. 30, 2012, now Pat. No. 9,910,808.

(51) Int. Cl.
*G06F 13/16* (2006.01)
*G06F 13/42* (2006.01)

(52) U.S. Cl.
CPC ...... *G06F 13/1673* (2013.01); *G06F 13/4282* (2013.01); *G06F 2213/0026* (2013.01)

(58) Field of Classification Search
CPC ............ G06F 13/1673; G06F 13/4282; G06F 2213/0026
See application file for complete search history.

(56) References Cited

U.S. PATENT DOCUMENTS

| | | |
|---|---|---|
| 4,418,386 A | 11/1983 | Vrielink |
| 4,803,613 A | 2/1989 | Kametani et al. |
| 5,440,746 A | 8/1995 | Lentz |
| 5,581,732 A | 12/1996 | Dann |
| 5,588,132 A | 12/1996 | Cardoza |
| 5,984,504 A | 11/1999 | Doyle et al. |

(Continued)

OTHER PUBLICATIONS

EP Office Action, dated Nov. 7, 2017, application No. EP 12876008.9, 6 pages.

(Continued)

*Primary Examiner* — Henry Tsai
*Assistant Examiner* — Christopher Daley
(74) *Attorney, Agent, or Firm* — Park, Vaughan, Fleming & Dowler LLP (57) ABSTRACT

In at least some examples, a computing node includes a processor and a local memory coupled to the processor. The computing node also includes a reflective memory bridge coupled to the processor. The reflective memory bridge maps to an incoming region of the local memory assigned to at least one external computing node and maps to an outgoing region of the local memory assigned to at least one external computing node.

20 Claims, 10 Drawing Sheets

(56) References Cited

U.S. PATENT DOCUMENTS

| | | |
|---|---|---|
| 5,987,496 A | 11/1999 | Shen et al. |
| 6,026,451 A | 2/2000 | Sreenivas |
| 6,067,595 A | 5/2000 | Lindenstruth |
| 6,907,042 B1 | 6/2005 | Oguchi |
| 6,941,396 B1 | 9/2005 | Thorpe et al. |
| 7,480,726 B2 | 1/2009 | Ketkar et al. |
| 7,844,852 B2 | 11/2010 | Koishi |
| 8,468,308 B2 | 6/2013 | Steely, Jr. et al. |
| 8,938,559 B2 | 1/2015 | Chandhoke et al. |
| 2001/0052056 A1 | 12/2001 | Acton et al. |
| 2003/0110233 A1 | 6/2003 | Prall et al. |
| 2004/0117580 A1 | 6/2004 | Wu et al. |
| 2007/0239797 A1 | 10/2007 | Cattell et al. |
| 2008/0189239 A1 | 8/2008 | Bawa et al. |
| 2009/0144750 A1 | 6/2009 | Little |
| 2009/0287889 A1 | 11/2009 | Abts et al. |
| 2010/0017647 A1 | 1/2010 | Callaway et al. |
| 2010/0082655 A1 | 4/2010 | Silberstein et al. |
| 2011/0145204 A1 | 6/2011 | Maple et al. |
| 2011/0225122 A1 | 9/2011 | Denuit et al. |
| 2012/0124297 A1 | 5/2012 | Chung et al. |
| 2013/0091331 A1* | 4/2013 | Moraru .............. G06F 12/126 711/143 |
| 2013/0235870 A1* | 9/2013 | Tripathi ............. H04L 41/5019 370/390 |
| 2015/0378931 A1* | 12/2015 | White ................ G06F 3/06 711/6 |

OTHER PUBLICATIONS

International Searching Authority, The International Search Report and the Written Opinion, Dec. 21, 2012, 9 Pages.

Kohmann, H. "Optimized Interconnect Solutions," Dophin Interconnect Solutions, Copyright 2010, 31 p.

Paraccel, "The Paraccel Analytic Database," A Technical Overview, Version 3.0, Dec. 10, 2010, White Paper, 28 p.

Supplementary European Search Report dated Dec. 21, 2015, Application No. EP 12876008.9, 6 pages.

* cited by examiner

REFLECTIVE MEMORY BRIDGE
110

- FOR EACH INCOMING REGION
    - NAME
    - PHYSICAL ADDESSES ASSOCIATED WITH THE INCOMING REGION
    - SET OF EXTERNAL COMPUTING NODES THAT ARE TO REFLECT TO THE INCOMING REGION

- FOR EACH OUTGOING REGION
    - NAME
    - PHYSICAL ADDESSES ASSOCIATED WITH THE OUTGOING REGION
    - SET OF EXTERNAL COMPUTING NODES THAT ARE TO RECEIVE UPDATES TO THE OUTGOING REGION

REFLECTIVE MEMORY BRIDGE FOR EXTERNAL COMPUTING NODES

BACKGROUND

Database systems are evolving from disk-based single server systems with high input/output (I/O) rates and small memories, to clusters of independent nodes which hold the database entirely in memory. These systems often rely on horizontal partitioning (or sharing) for scaling and k-safety (synchronous replication) to provide durability.

Data contention and metadata contention are ongoing challenges for online transaction processing (OLTP) systems. The probability of contention increases as the number of parallel transactions in the system increases. Transaction response time is linked to the number of active parallel transactions by Little's law. This law states that the number of transactions in a system equals the throughput multiplied by the response time.

BRIEF DESCRIPTION OF THE DRAWINGS

For a detailed description of illustrative examples of the disclosure, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to methods and systems for employing reflective memory in a multi-node computing and database environment. In one example, a computing node may include local memory and a reflective memory bridge (controller) that maps to an incoming region of the local memory assigned to at least one external computing node and that maps to an outgoing region of the local memory assigned to at least one external computing node. The reflective memory bridge may be integrated with another component such as a processor, a node controller, a coherency bus, or a peripheral component interconnect (PCI) card. As used herein, an "external computing node" refers to a computer running a different instance of an operating system and not necessarily running the same operating system or using the same CPU architecture. As used herein, "reflective memory" refers to a mechanism for snarfing data written to one or more regions of memory of a node. In the disclosed examples, when a store falls within a particular range of addresses, a copy of the data is forwarded to at least one external computing node. The external node's reflective memory controller stores the write data in that node's memory at a relative memory location that corresponds to the particular range from which the data was sent.

In the disclosed examples, reflective memory is used to maintain a coherent copy of a memory region in one node or multiple nodes in order to maintain the database concept of k-safety. Examples of applications which use k-safety are Vertica and Hadoop. The disclosed examples maintain the concept of k-safety with minimum latency and without requiring input/output path instructions to be executed on the nodes involved. The interconnect between nodes does not have to be a reflective memory bus, but rather can be any interconnect including a network. The network should maintain the order of forwarded stores from each node-region pair to each particular node. No other ordering is necessary (e.g., no ordering between regions is needed).

Without limitation to other examples, the reflective memory bridge may specify for an outgoing region: a name, addresses associated with the outgoing region, and a set of external computing nodes that are to receive updates to the outgoing region. Further, the reflective memory bridge may specify for an incoming region: a name, addresses associated with the incoming region, and a set of external computing nodes that are to reflect to the incoming region. In some examples, a reflective memory bridge may specify a plurality of different outgoing regions and/or incoming regions. Further, a reflective memory bridge may update the plurality of different outgoing regions and/or incoming regions upon request from a user or administrator. Further, a reflective memory bridge may be part of with a coherency fabric and/or an interconnect monitoring interface of a computing node.

In some examples, the addresses corresponding to the incoming regions and outgoing regions are physical memory addresses. In other examples, snarfing may occur pre-V2P (virtual-to-physical), and a field in the virtual address would contain the remote node ID or a broadcast key. Likewise, an incoming transaction would have a virtual address which would get protection-checked and translated by the receiving core just like a store that originated from its own pipeline.

In some examples, a computing node includes a database with access to the reflective memory bridge. Without limitation to other examples, the database may utilize the reflective memory bridge to perform operations such as communicating commands or results to at least one external computing node, distributing logs, updates, and new data to at least one external computing node, communicating information for two-phase commits to at least one other computing node, maintaining k-safety by reflecting at least part of a projection being written to a mirror node, and/or writing to a logging appliance.

The disclosed examples for employing reflective memory in a multi-node computing and database environment differ from message-based systems that transmit messages with a contiguous buffer over a network, or systems that rely on a shared memory paradigm. While the shared memory paradigm is easy to program and is efficient, shared memory systems are subject to single points of failure that can bring down all systems accessing the shared memory region. Meanwhile, message-based systems require buffers to be constructed after which the message is sent to the other system. Because no part of the message is sent until the buffer filling is completed, significant instruction path length increases may occur during I/O operations and may interrupt processing. Use of reflective memory operations to reduce transaction response time across multiple computing nodes as disclosed reduces lock and latch related contention and in the end helps to further reduce response time.

The disclosed examples for employing reflective memory in a multi-node computing and database environment should not be interpreted, or otherwise used, as limiting the scope of the disclosure, including the claims. In addition, one skilled in the art will understand that the following description has broad application, and the discussion of any particular example is not intended to intimate that the scope of the disclosure, including the claims, is limited to that example.

Figure 1:
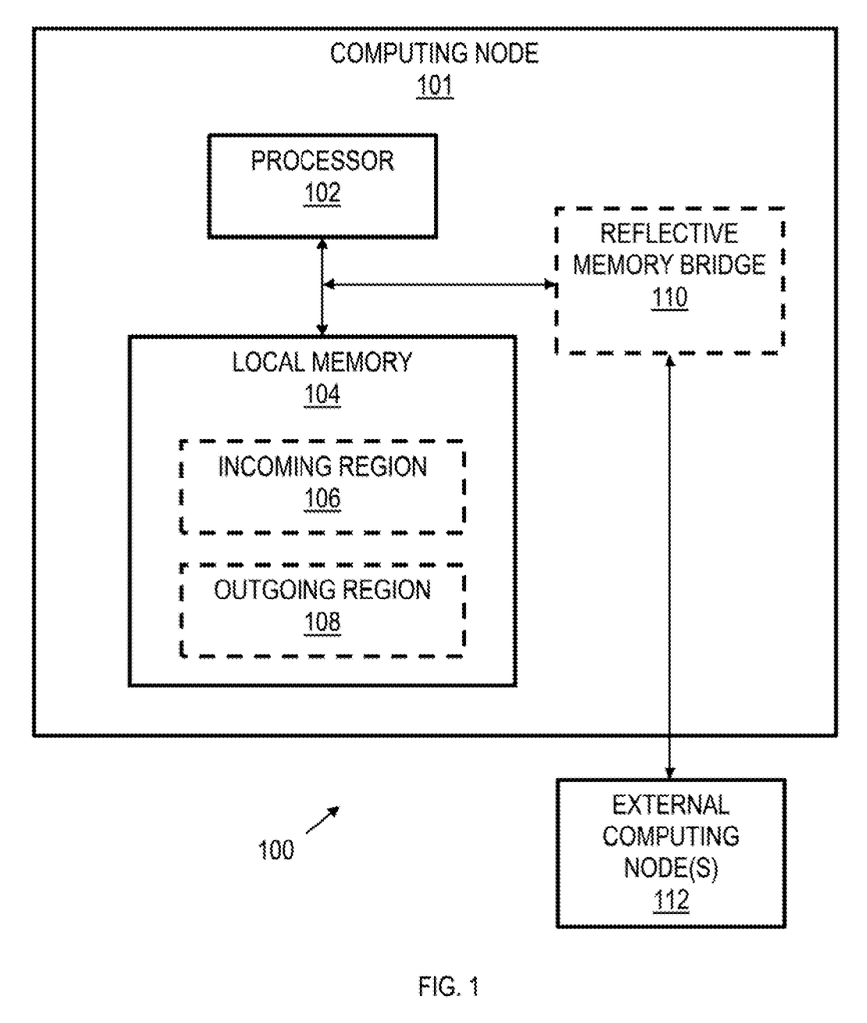
FIG. 1 shows an example of a computing node system in accordance with the disclosure.

FIG. 1 shows an example of a computing node system 100 in accordance with the disclosure. As shown, the computing node system 100 comprises a computing node 101 in communication with external computing nodes 112. More specifically, the computing node 101 comprises a processor 102 coupled to a local memory 104 with an incoming region 106 and an outgoing region 108 associated with a reflective memory bridge 110. The reflective memory bridge 110 maps to the incoming region 106, which is assigned to at least one external computing node 112. The reflective memory bridge 110 also maps to the outgoing region 106, which is assigned to at least one external computing node 112. The external computing nodes 112 corresponding to the incoming region 106 may be the same or may be different than the external computing nodes 112 corresponding to the outgoing region 108. Although not required, the computing node 101 may optionally include input/output (I/O) interface components (not shown for convenience).

For the incoming region 106, the reflective memory bridge 110 specifies a name or identifier, physical addresses associated with the incoming region 106, and a set of external computing nodes 112 that are to reflect to the incoming region 106. For the outgoing region 108, the reflective memory bridge 110 specifies a name or identifier, physical addresses associated with the outgoing region 108, and a set of external computing nodes that are to receive updates to the outgoing region 108. In at least some examples, stores from the reflective memory bridge 110 are not reflected. More specifically, stores generated by a destination node will not be reflected. Thus, two nodes are able to reflect the same memory locations to each other (similar to shared memory) without risking an infinite loop. In other examples, regions are set up so that node A reflects to node B, and node B reflects the region to node C. In another example, node A reflects to nodes B and C.

In some examples, the reflective memory bridge 110 corresponds to an application-specific integrated circuit (ASIC) configured to perform the reflective memory operations described herein. Alternatively, the reflective memory bridge 110 may correspond to a processor executing reflective memory bridge instructions stored in a memory available to the processor. Alternatively, the reflective memory bridge 110 may correspond to programmable logic configured to perform the reflective memory operations described herein. The decisions regarding how to implement the reflective memory bridge may be based, for example, on performance criteria, cost criteria, and/or compatibility criteria. For all implementations, the reflective memory bridge 110 needs to be compatible with an existing or planned coherency fabric of a computing node.

In operation, the reflective memory bridge 110 observes all stores to the outgoing region 108 and transmits those stores to others of the external computing nodes 112. The external computing nodes 112 may each comprise their own local reflective memory bridge to repeat those stores to local memory. In this manner, a message or change in state is transmitted as it is composed rather than waiting to transmit the first byte until the last byte is copied into a buffer as is done for buffer-based systems. Also, there is no requirement that the words in a message be written in order. To be clear, while there is no requirement that the words in a region be written in any particular order, the words written from a node to the region will be reflected in order to all sharing nodes. If two nodes are writing to the same region all sharing nodes may not see those writes in the same order. It is the responsibility of reflective memory bridge software to deal with this possibility. Single writer multiple readers are able to see stores in the same order.

Thus, while traditional message passing waits to begin transmission until the last store to a buffer is completed, reflective memory operations implemented by the reflective memory bridge 110 allows each store to be sent immediately (i.e., message latency is reduced).

The disclosed approach differs from traditional sender-managed communications (e.g. remote direct memory access or RDMA) in that there is no need to build a buffer, nor execute a protocol stack, nor field an interrupt (these operations may still be optionally done). This permits flexible zero copy solutions.

In the disclosed computing node system 100, no memory is shared and there are no multi-node single points of failure. In other words, each computing node (e.g., computing nodes 101 and 112) has its own local memory into which updates are copied, and none of the computing nodes 101 and 112 reads another's local memory. Readers and writers may fail, but this will not cause a hardware crash in other nodes. Also, since a region of memory is watched for update, it is possible to keep data structures update in situ, and not require a buffer to be created. This allows scatter-scatter communication. Although only one incoming region 106 and one outgoing region 108 are shown in FIG. 1, additional incoming regions and/or outgoing regions may be defined, where each region can independently be reflected to a different set of servers corresponding to the external computing nodes 112.

To set up reflective memory operation, each computing node (e.g., computing nodes 101 and 112) of the computing node system 100 may communicate with its respective reflective memory bridge through a memory mapped region. This region is used to set up one or more outgoing memory regions to be reflected. In some examples, for each outgoing region the following is specified: a name for the region (if empty this region is not active), physical addresses that contribute to the region, and a set of nodes that will receive updates to this region. Similarly, for each incoming region, the following may specified: a name for the region (matched to incoming regions or empty if this region is not active), physical addresses that comprise the region, and a set of nodes which may reflect to this region (the nodes may be checked to reduce errors). The specified incoming regions will receive data reflected from a sender node, where the mapping of addresses is relative to the first byte of each region.

Additional extensions to the computing node system 100 may include at least one memory mapped register that tracks a count of how many writes of a region are still in hardware buffers and have not yet been transferred. The memory mapped register(s) is incremented whenever a write is observed and decremented when a write has been sent to the external computing nodes 112. In this manner, a sender can be sure that a message has been sent. Along the same lines, an interrupt could be raised if the hardware buffers have reached a threshold fill level, indicating a possible interconnect problem.

For some examples of the computing node system 100, there may be a need for safe and efficient synchronization. Toward that end, memory mapped interfaces could be used to allow remote read/exchange constructs and/or read/increment constructs with timeout/error indications in the event that the memory is unavailable. In some examples, one of the Lamport algorithms may be used for high-priority sections. Without limitation to other examples, the reflective memory bridge 110 may enable the computing node 101 to communicate commands and results to at least one of the external computing nodes 112, to distribute logs, updates and new data across the external computing nodes 112, to communicate information for two-phase commits to at least one of the external nodes 112, to maintain k-safety by reflecting the part of a projection that is being written to at least at least one of the external computing nodes 112 operating as a mirror node for the computing node 101, and to write to a logging appliance corresponding to at least one of the external computing nodes 112.

Use of the reflective memory bridge as described herein reduces communications related latencies significantly and requires no driver overhead. Thus, there is little to no impact on instruction path length and building of a contiguous buffer is avoided. Further, zero copy is possible. Further, multi-node single points of failure are avoided. Further, in situ synchronization of data structures is possible. Further, by reducing communications latency the disclosed reflective memory operations enable the highest scaling of horizontally partitioned databases.

FIGS. 2A-2D show other examples of computing node systems 200A-200D in accordance with the disclosure. As shown, in the computing node system 200A of FIG. 2A, the computing node 201A comprises a processor 202 with the reflective memory bridge 110 integrated therein. In the computing node 201A, a coherency fabric 212 enables reflective memory operations involving the processor 202, the local memory 104, and the external computing nodes 112. Alternatively, the reflective memory bridge 110 may be implemented off of the coherency fabric 212 or directly from the bridge, or from the bridge to an I/O device to an interconnect that is not the coherency fabric 212.

Figure 2A:
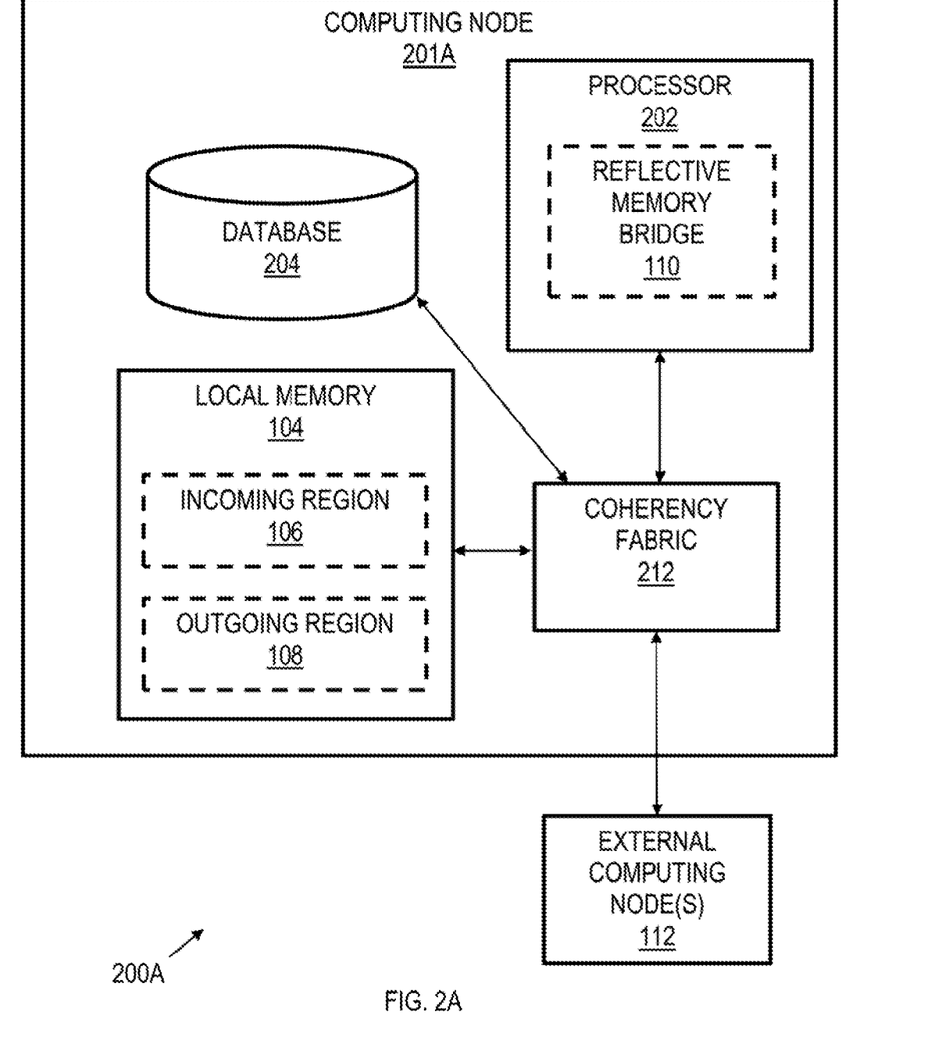
FIGS. 2A-2D show other examples of computing node systems in accordance with the disclosure.

Further, a database 204 of the computing node 201A is able to request that the reflected memory controller 110 perform reflective memory operations to communicate commands and results to at least one of the external computing nodes 112, to distribute logs, updates and new data across the external computing nodes 112, to communicate information for two-phase commits to at least one of the external nodes 112, to maintain k-safety by reflecting the part of a projection that is being written to at least at least one of the external computing nodes 112 operating as a mirror node for the computing node 201A, and to write to a logging appliance corresponding to at least one of the external computing nodes 112.

Figure 2B:
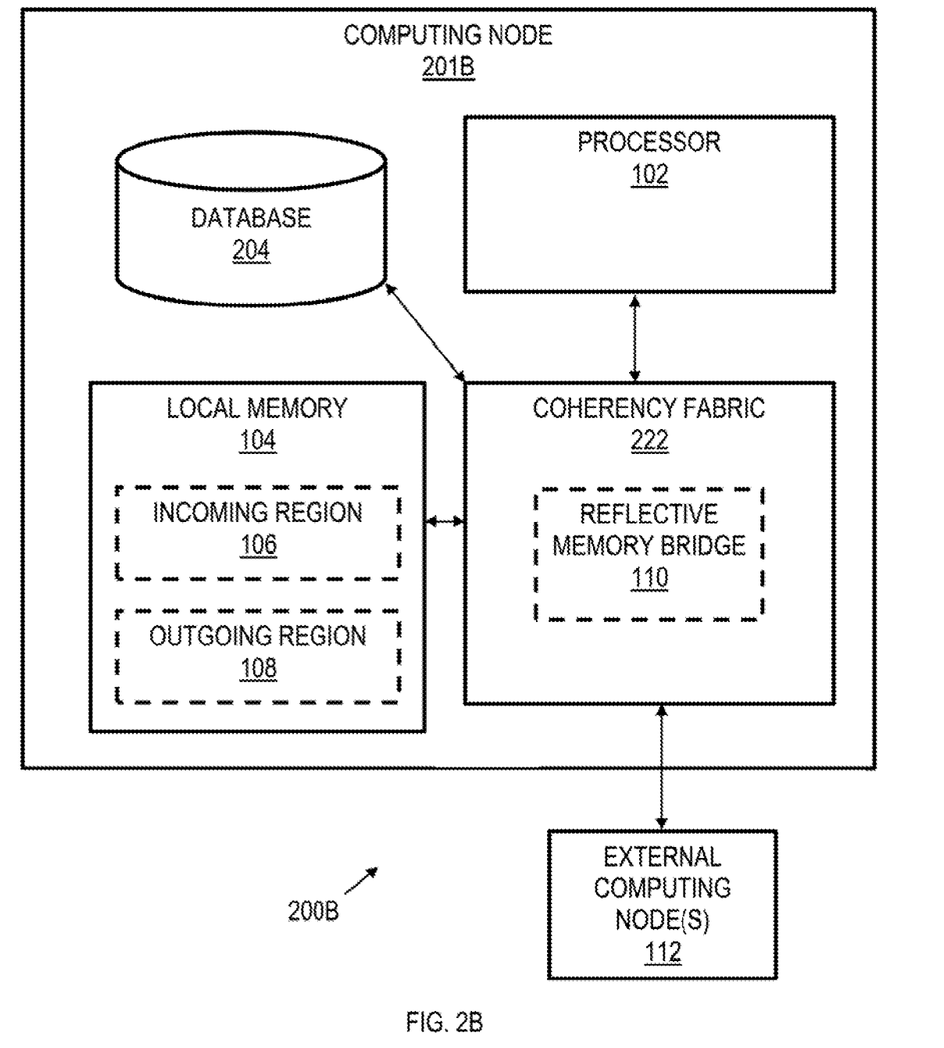

In the computing node system 200B of FIG. 2B, the computing node 201B comprises the processor 102 and a coherency fabric 222 with the reflective memory bridge 110 integrated therein. In the computing node 201B, the coherency fabric 222 enables reflective memory operations involving the processor 102, the local memory 104, and the external computing nodes 112. Further, the database 204 of the computing node 201B is able to request that the reflected memory controller 110 perform reflective memory operations to communicate data, logs, commands, two-phase commits, and/or k-safety mirroring projections to at least one of the external computing nodes 112 as described herein.

Figure 2C:
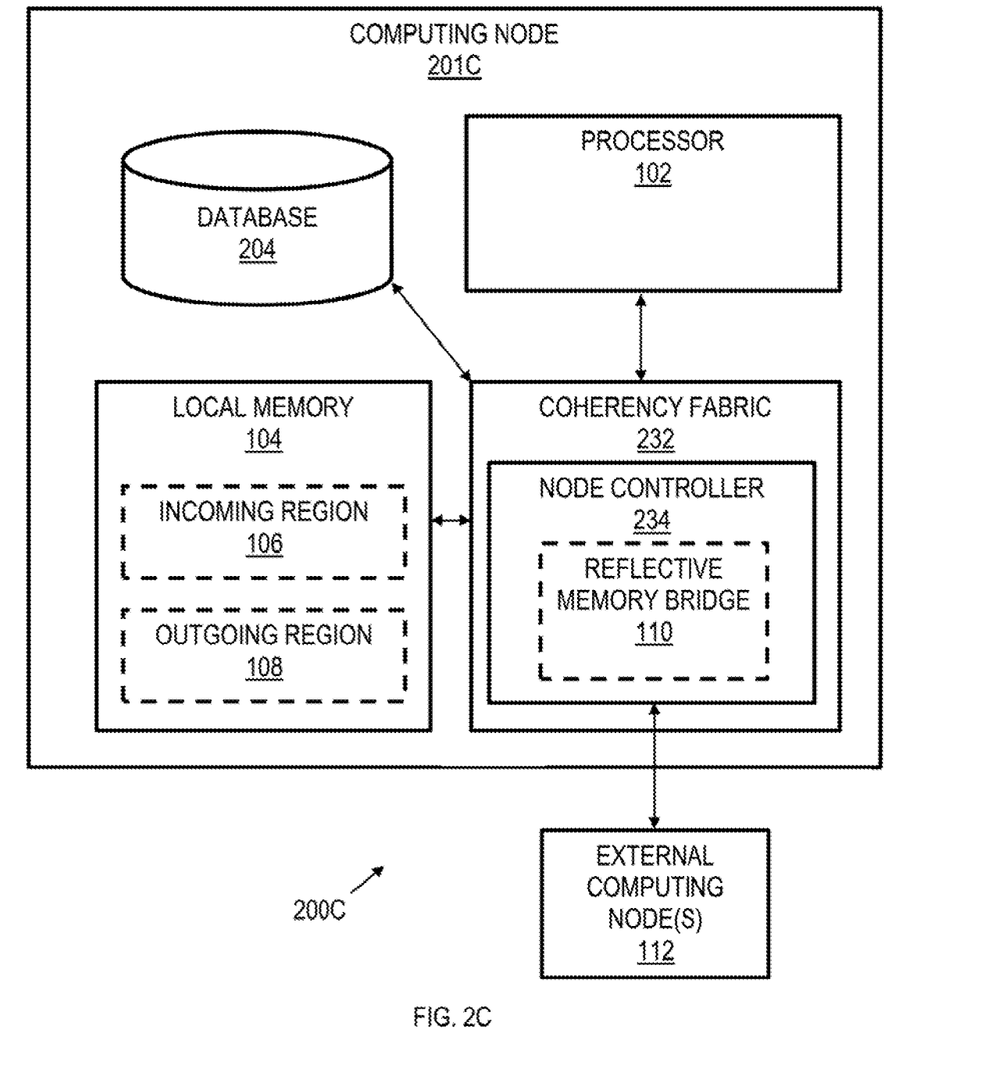

In the computing node system 200C of FIG. 2C, the computing node 201C comprises the processor 102 and a coherency fabric 232 with a node controller 234 having the reflective memory bridge 110 integrated therein. Without limitation to other examples, the node controller 234 may operate in accordance with a quickpath interconnect (QPI) architecture. In the computing node 201C, the coherency fabric 232 enables reflective memory operations involving the processor 102, the local memory 104, and the external computing nodes 112. Further, the database 204 of the computing node 201C is able to request that the reflected memory controller 110 perform reflective memory operations to communicate data, logs, commands, two-phase commits, and/or k-safety mirroring projections to at least one of the external computing nodes 112 as described herein.

Figure 2D:
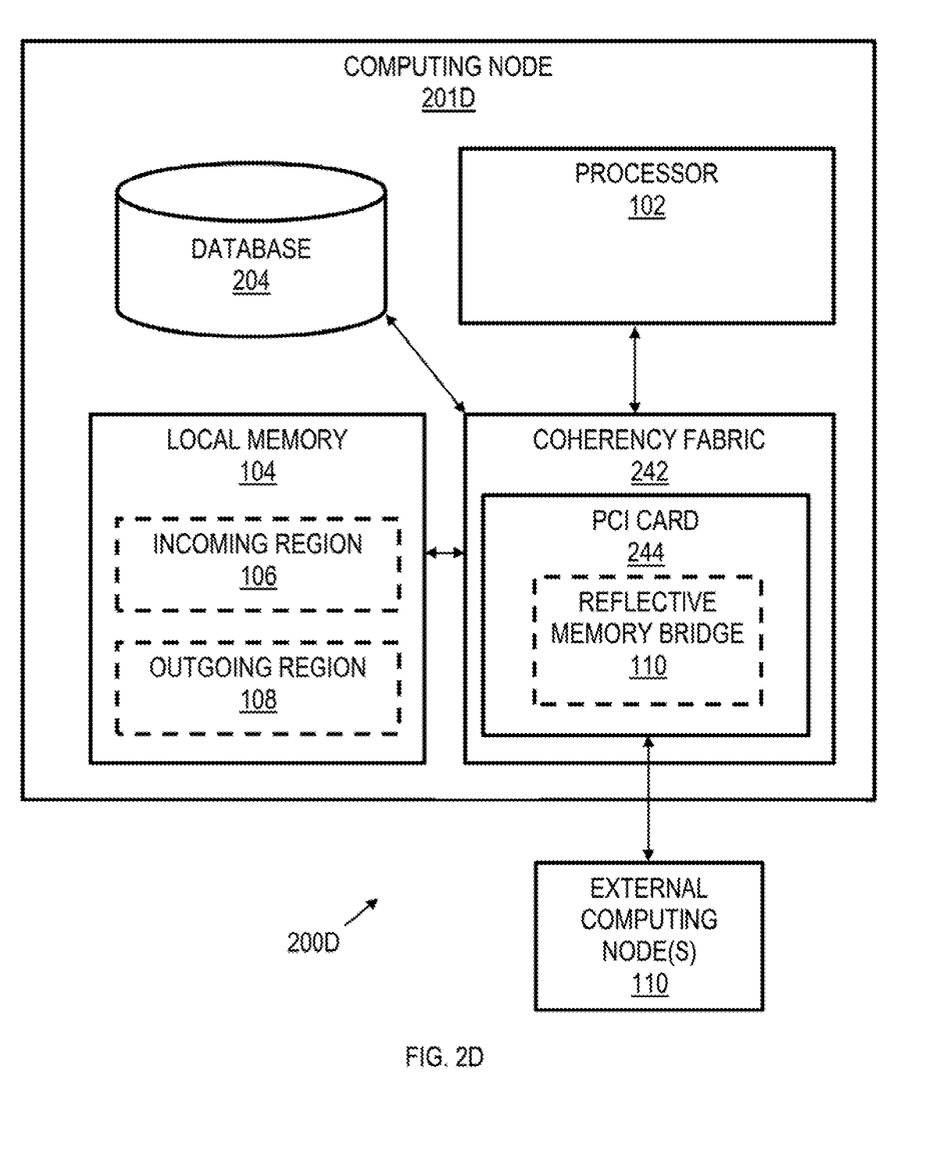

In the computing node system 200D of FIG. 2D, the computing node 201D comprises the processor 102 and a coherency fabric 242 with a PCI card 244 having the reflective memory bridge 110 integrated therein. In the computing node 201D, the coherency fabric 232 enables reflective memory operations involving the processor 102, the local memory 104, and external computing nodes 112. Further, the database 204 of the computing node 201D is able to request that the reflected memory controller 110 perform reflective memory operations to communicate data, logs, commands, two-phase commits, and/or k-safety mirroring projections to at least one of the external computing nodes 112 as described herein.

In the computing node systems 200A-200D of FIGS. 2A-2D, the external computing nodes 112 may implement any of the reflective memory bridge configurations described herein. The position of the reflective memory bridge 110 for a particular computing node (e.g., computing node 101, computing nodes 201A-201D, and computing nodes 112) may vary according to considerations such as implementation timing, implementation complexity, spacing requirements, and/or component availability.

Figure 3:
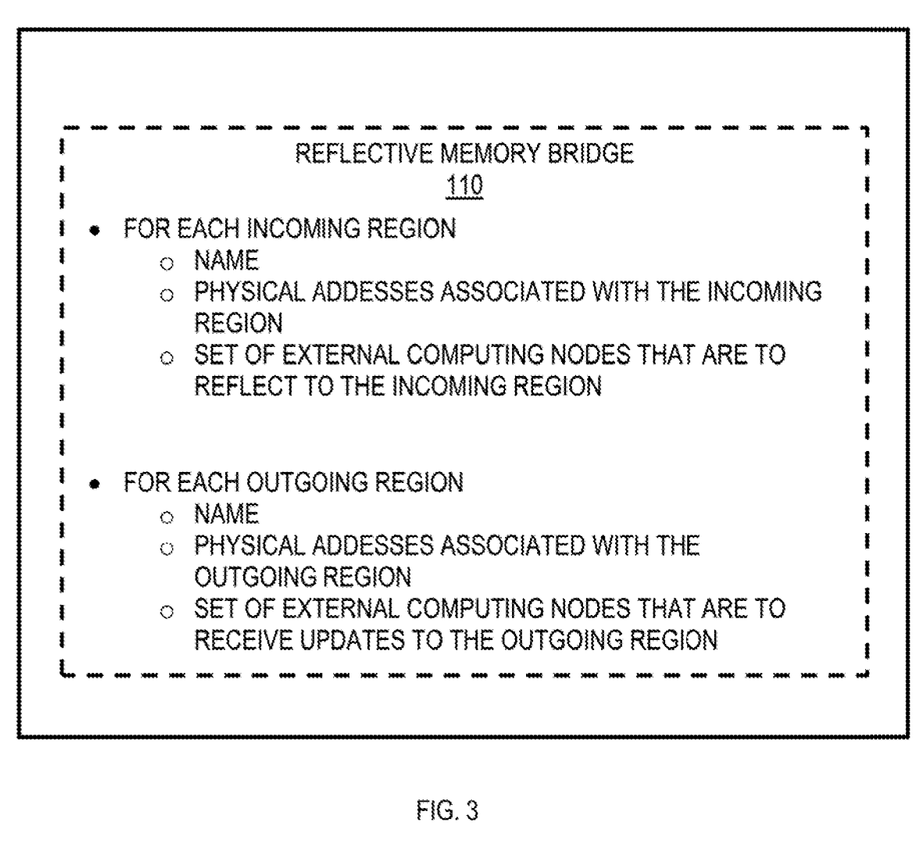
FIG. 3 shows an example of an integrated circuit in accordance with the disclosure.

FIG. 3 shows an example of an integrated circuit 300 in accordance with the disclosure. The integrated circuit 300 may correspond to, for example, a processor, a node controller, a PCI card, or a coherency fabric component. As shown, the integrated circuit 300 comprises the reflective memory bridge 110, which is shown to specify for each incoming region: a name for the region (matched to incoming regions or empty if this region is not active), physical addresses that comprise the region, and a set of nodes which may reflect to this region (the nodes may be checked to reduce errors). Further, the reflective memory bridge 110 of the integrated circuit 300 may specify for each outgoing region: a name for the region (if empty this region is not active), physical addresses that contribute to the region, and a set of nodes that will receive updates to this region. As needed, the incoming regions or outgoing regions specified for the reflective memory bridge 110 of the integrated circuit 300 may be updated by a user or administrator.

Figure 4:
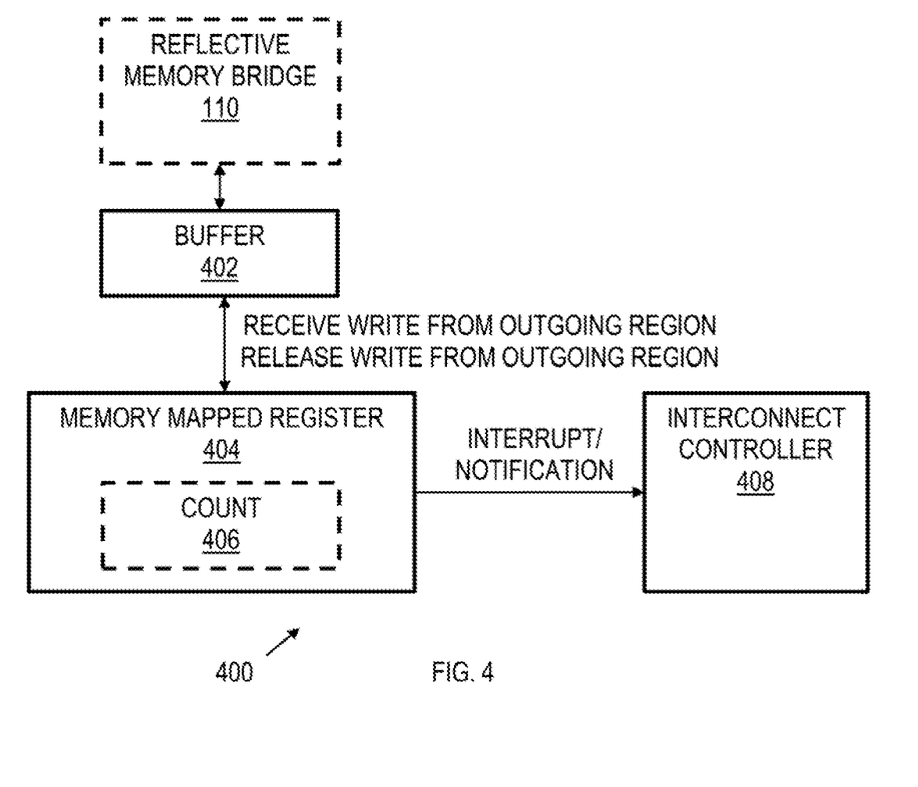
FIG. 4 shows an example of a monitoring system for a computing node in accordance with the disclosure.

FIG. 4 shows an example of a monitoring system 400 for a computing node in accordance with the disclosure. The monitoring system 400 is able to detect when an interconnect for reflective memory operations becomes unavailable. As shown, the monitoring system 400 may comprise a buffer 402 that receives and releases writes of an outgoing region (e.g., the outgoing region 108) of local memory assigned for reflective memory operations. The monitoring system 400 also comprises a memory mapped register 404 that maintains a count 406 based on incrementing the count 406 when the buffer 402 receives a write from an outgoing region and based on decrementing the count 406 when the buffer 402 releases a write for transmission to an external computer node. If the count 406 exceeds a predetermined threshold (e.g., a fill level for the buffer 402 exceeds a predetermined threshold), an interrupt or notification is sent from the memory mapped register 404 to an interconnect controller 408 to report an unavailable interconnect.

Figure 5:
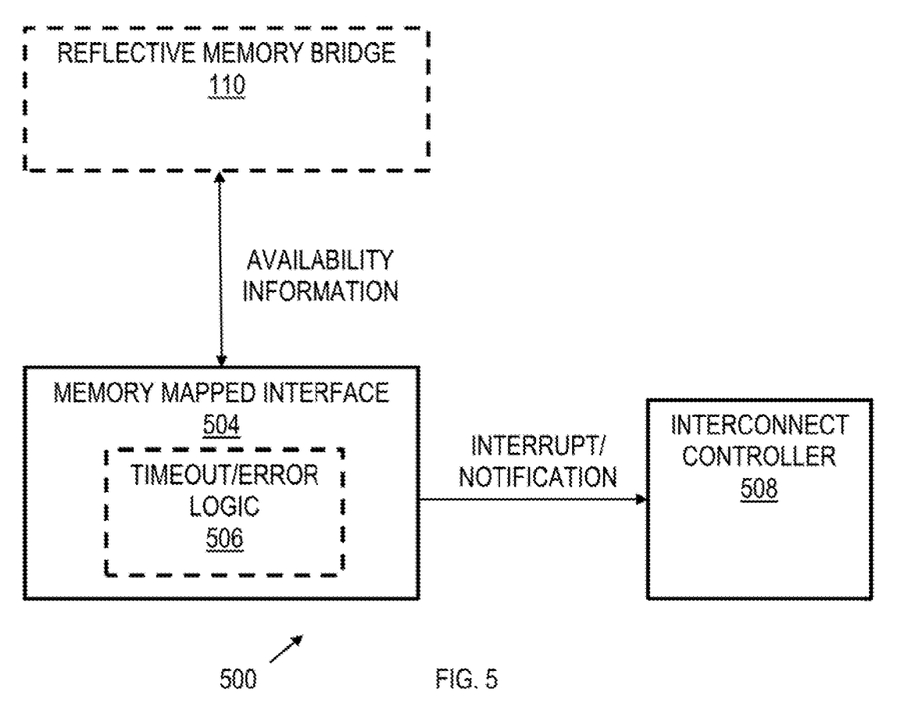
FIG. 5 shows an example of another monitoring system for a computing node in accordance with the disclosure.

FIG. 5 shows an example of another monitoring system 500 for a computing node in accordance with the disclosure. The monitoring system 500 is able to detect when a memory region for reflective memory operations becomes unavailable. As shown, the monitoring system 500 may comprise a memory mapped interface 504 with timeout/error logic 506 to assert a timeout or error based on the availability information. The memory mapped interface 504 may, for example, support remote read/exchange constructs or remote read/increment constructs with timeout or error indications provided by the timeout/error logic 510 when an outgoing region or an incoming region for reflective memory operations is unavailable. In such case, an interrupt or notification is sent from the memory mapped interface 504 to an interconnect controller 508 to report an unavailable memory region. The unavailability of a memory region or interconnect may occur for several reasons. For example, the receiver might crash causing the buffer to fill, an interconnect may have a glitch causing it to stop communications with an external node or nodes, or human error, (e.g., someone kicks out a power or network cable) may cause a memory region or interconnect to be unavailable.

Figure 6:
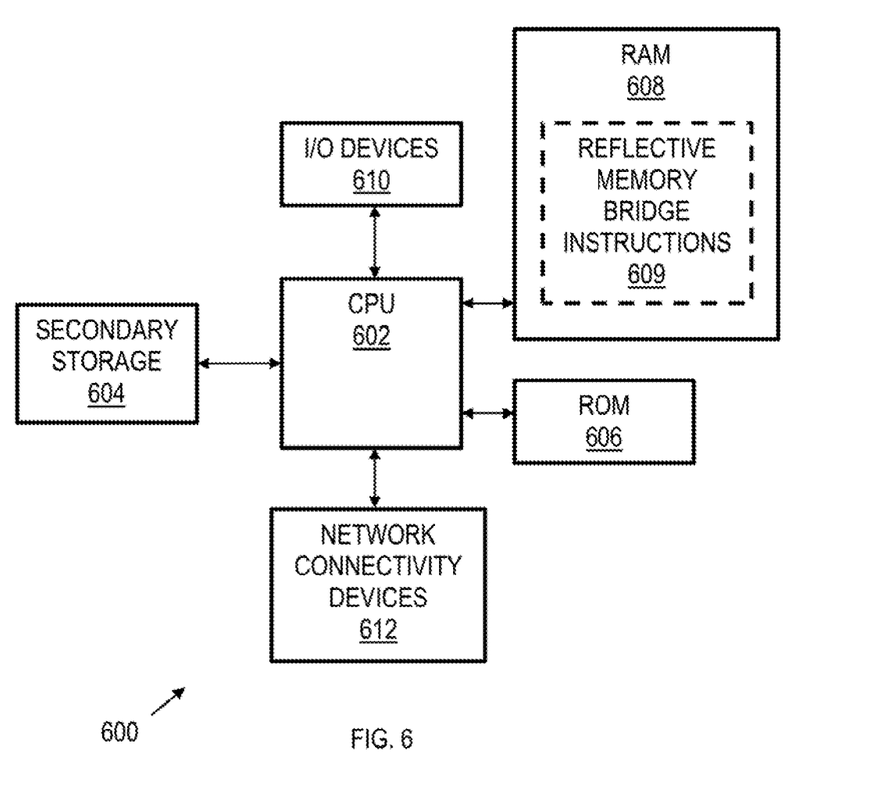
FIG. 6 shows an example of a computer system in accordance with the disclosure.

FIG. 6 shows an example of various components of a computer system or node 600 in accordance with the disclosure. The computer system 600 may perform various operations to support the reflective memory operations described herein. The computer system 600 may correspond to components of the computing node 101, components of the computing node 201A-201D, or components of the external computing nodes 112 described herein.

As shown, the computer system 600 includes a processor 602 (which may be referred to as a central processor unit or CPU) that is in communication with memory devices including secondary storage 604, read only memory (ROM) 606, random access memory (RAM) 608, input/output (I/O) devices 610, and network connectivity devices 612. The processor 602 may be implemented as one or more CPU chips.

It is understood that by programming and/or loading executable instructions onto the computer system 600, at least one of the CPU 602, the RAM 608, and the ROM 606 are changed, transforming the computer system 600 in part into a particular machine or apparatus having the novel functionality taught by the present disclosure. In the electrical engineering and software engineering arts functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. For example, a design that is still subject to frequent change may be implemented in software, because re-spinning a hardware implementation is more expensive than re-spinning a software design. Meanwhile, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 604 may be comprised of one or more disk drives or tape drives and is used for non-volatile storage of data and as an over-flow data storage device if RAM 608 is not large enough to hold all working data. Secondary storage 604 may be used to store programs which are loaded into RAM 608 when such programs are selected for execution. The ROM 606 is used to store instructions and perhaps data which are read during program execution. ROM 606 is a non-volatile memory device which typically has a small memory capacity relative to the larger memory capacity of secondary storage 604. The RAM 608 is used to store volatile data and perhaps to store instructions. Access to both ROM 606 and RAM 608 is typically faster than to secondary storage 604. The secondary storage 604, the RAM 608, and/or the ROM 606 may be referred to in some contexts as computer readable storage media and/or non-transitory computer readable media.

I/O devices 610 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 612 may take the force of modems, modern banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 612 may enable the processor 602 to communicate with the Internet or one or more intranets. With such a network connection, it is contemplated that the processor 602 might receive information from the network, or might output information to the network in the course of performing the above-described method steps. Such information, which is often represented as a sequence of instructions to be executed using processor 602, may be received from and outputted to the network, for example, in the form of a computer data signal embodied in a carrier wave.

Such information, which may include data or instructions to be executed using processor 602 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods known to one skilled in the art. The baseband signal and/or signal embodied in the carrier wave may be referred to in some contexts as a transitory signal.

The processor 602 executes instructions, codes, computer programs, scripts which it accesses from hard disk, floppy disk, optical disk (these various disk based systems may all be considered secondary storage 604), ROM 606, RAM 608, or the network connectivity devices 612. While only one processor 602 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 604, for example, hard drives, floppy disks, optical disks, and/or other device, the ROM 606, and/or the RAM 608 may be referred to in some contexts as non-transitory instructions and/or non-transitory information.

In an embodiment, the computer system 600 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 600 to provide the functionality of a number of servers that is not directly bound to the number of computers in the computer system 600. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the reflective memory bridge functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 600, at least portions of the contents of the computer program product to the secondary storage 604, to the ROM 606, to the RAM 608, and/or to other non-volatile memory and volatile memory of the computer system 600. The processor 602 may process the executable instructions and/or data structures in part by directly accessing the computer program product, for example by reading from a CD-ROM disk inserted into a disk drive peripheral of the computer system 600. Alternatively, the processor 602 may process the executable instructions and/or data structures by remotely accessing the computer program product, for example by downloading the executable instructions and/or data structures from a remote server through the network connectivity devices 612. The computer program product may comprise instructions that promote the loading and/or copying of data, data structures, files, and/or executable instructions to the secondary storage 604, to the ROM 606, to the RAM 608, and/or to other non-volatile memory and volatile memory of the computer system 600.

In some contexts, the secondary storage 604, the ROM 606, and the RAM 608 may be referred to as a non-transitory computer readable medium or a computer readable storage media. A dynamic RAM embodiment of the RAM 608, likewise, may be referred to as a non-transitory computer readable medium in that while the dynamic RAM receives electrical power and is operated in accordance with its design, for example during a period of time during which the computer 600 is turned on and operational, the dynamic RAM stores information that is written to it. Similarly, the processor 602 may comprise an internal RAM, an internal ROM, a cache memory, and/or other internal non-transitory storage blocks, sections, or components that may be referred to in some contexts as non-transitory computer readable media or computer readable storage media.

In some examples, a non-transitory computer-readable storage medium may store reflective memory bridge instructions 609 that, when executed, cause the processor 602 to assign an incoming region of a Racal memory to at least one external computing node. The reflective memory bridge instructions 609, when executed, also may cause the processor 602 to assign an outgoing region of the local memory to at least one external computing node. The reflective memory bridge instructions 609, when executed, also may cause the processor 602 to perform reflective memory operations using the incoming region and the outgoing region. In some examples, the reflective memory bridge instructions 609, when executed, may cause the processor 602 to store for an outgoing region: a name, physical addresses associated with the outgoing region, and a set of external computing nodes that are to receive updates to the outgoing region. Further, the reflective memory bridge instructions 609, when executed, may cause the processor 602 to store for an incoming region: a name, physical addresses associating with incoming region, and a set of external computing nodes that are to reflect to the incoming region. Further, the reflective memory bridge instructions 609, when executed, may cause the processor 602 to determine a number of writes from an outgoing region that are still in a buffer by incrementing a count when a write from the outgoing region is observed and decrementing the count when a write is released from the buffer. Further, the reflective memory bridge instructions 609, when executed, may cause the processor 602 to perform other reflective memory bridge operations as described herein.

Figure 7:
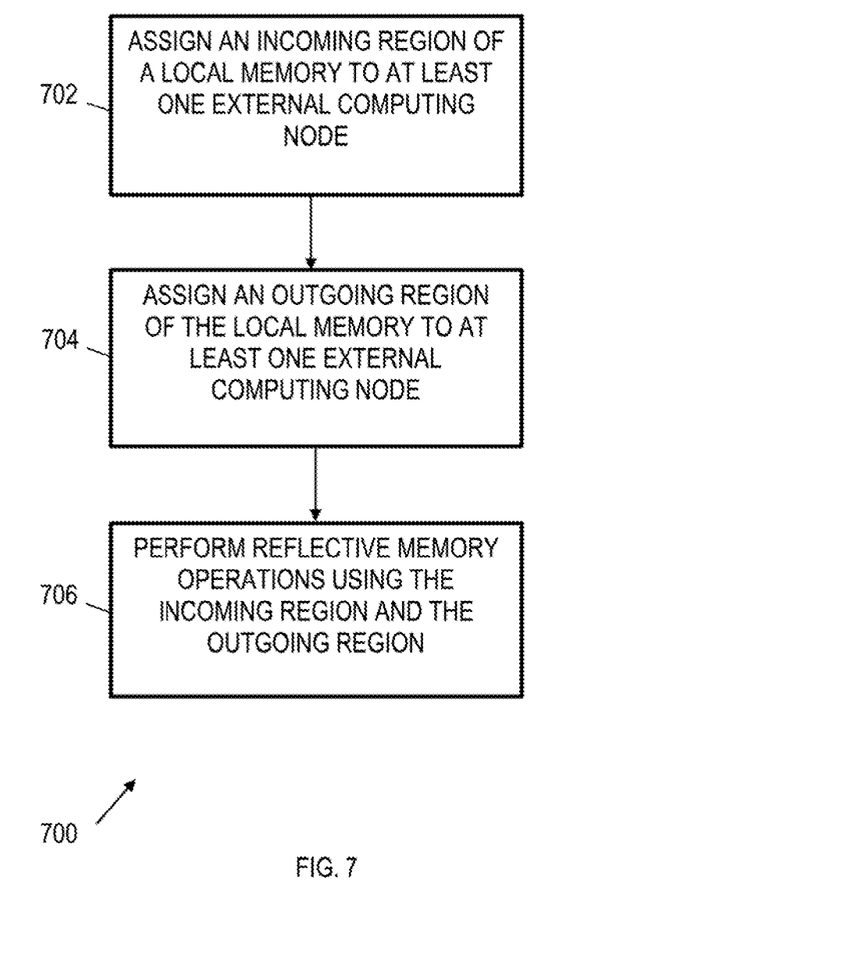
FIG. 7 shows an example of a method in accordance with the disclosure.

FIG. 7 shows an example of a method 700 in accordance with the disclosure. The method 700 may be performed by a reflective memory bridge and/or other components of a computing node such as of the computing node 101, components of the computing node 201A-201D, or components of the external computing nodes 112 described herein. As shown, the method 700 comprises assigning an incoming region of a local memory to at least one external computing node (block 702). At block 704, the method 700 also comprises assigning an outgoing region of the local memory to at least one external computing node. At block 706, the method 700 comprises performing reflective memory operations using the incoming region and the outgoing region.

In some examples, the method 700 may comprise additional or alternative steps. For example, the method 700 may further comprise storing for an outgoing region: a name, physical addresses associated with the outgoing region, and a set of external computing nodes that are to receive updates to the outgoing region. Further, the method 700 also may comprise storing for an incoming region: a name, physical addresses associating with incoming region, and a set of external computing nodes that are to reflect to the incoming region. Further, the method 700 also may comprise determining unavailability of an interconnect or a memory region used for reflective memory operations. Further, method 700 also may comprise performing other reflective memory bridge operations as described herein.

The above discussion is meant to be illustrative of the principles and various examples of the present invention. Numerous variations and modifications will become apparent to those skilled in the art once the above disclosure is fully appreciated. It is intended that the following claims be interpreted to embrace all such variations and modifications.

What is claimed is:

1. A computing node, comprising:
   a reflective memory bridge to map to an incoming region of a local memory assigned to an external computing node and to map to an outgoing region of the local memory assigned to an external computing node; and
   a memory mapped register to count a number of writes from the outgoing region that are still in a buffer by incrementing the count when a write from the outgoing region is monitored and decrementing the count when the write is released from the buffer;
   wherein a same counter of the memory mapped register is incremented when the write from the outgoing region is monitored and is decremented when the write is released from the buffer.

2. The computing node of claim 1, wherein the reflective memory bridge is part of a coherency fabric for the computing node and is integrated with a component selected from a list consisting of a processor, a node controller for the computing node, a coherency bus for the computing node, and a personal component interconnect (PCI) card for the computing node.

3. The computing node of claim 1, wherein the reflective memory bridge specifies for the outgoing region: a name, addresses associated with the outgoing region, and a set of external computing nodes that are to receive updates to the outgoing region.

4. The computing node of claim 1, wherein the reflective memory bridge specifies for the incoming region: a name, addresses associated with the incoming region, and a set of external computing nodes that are to reflect to the incoming region.

5. The computing node of claim 1, wherein stores from the reflective memory bridge are not reflected.

6. The computing node of claim 1, further comprising a memory mapped interface that allows remote read/exchange constructs or remote read/increment constructs.

7. The computing node of claim 6, wherein the memory mapped interface further transmits a timeout or error notification to an interconnect controller when the outgoing region or the incoming region is determined to be unavailable.

8. The computing node of claim 6, further comprising a database that utilizes the reflective memory bridge to communicate commands or results to at least one external computing node.

9. The computing node of claim 6, further comprising a database that utilizes the reflective memory bridge to distribute logs, updates, and new data to at least one external computing node.

10. The computing node of claim 6, further comprising a database that utilizes the reflective memory bridge to communicate information for two-phase commits to at least one other computing node.

11. The computing node of claim 6, further comprising a database that utilizes the reflective memory bridge to maintain k-safety by reflecting at least part of a projection being written to a mirror node.

12. A computing node comprising:
    a reflective memory bridge to map to an incoming region of a local memory assigned to an external computing node and to map to an outgoing region of the local memory of the local memory assigned to an external computing node;
    a database that utilizes the reflective memory bridge to communicate information for two-phase commits to another computing node; and
    a monitoring circuit to monitor that an interconnect between the computing node and the external node is operable by tracking a number of writes from the outgoing region that are still in a buffer,
    wherein a same counter is incremented when a write is monitored from the outgoing region and is decremented when the write is released from the buffer.

13. The computing node of claim 12, wherein the reflective memory bridge specifies for the outgoing region: a name, addresses associated with the outgoing region, and a set of external computing nodes that are to receive updates to the outgoing region.

14. The computing node of claim 12, wherein the reflective memory bridge specifies for the incoming region: a name, addresses associated with the incoming region, and a set of external computing nodes that are to reflect to the incoming region.

15. The computing node of claim 12, further comprising a memory mapped interface that allows remote read/exchange constructs or remote read/increment constructs.

16. The computing node of claim 15, wherein the memory mapped interface further transmits a timeout or error notification to an interconnect controller when the outgoing region or the incoming region is determined to be unavailable.

17. A computing node comprising:
    a reflective memory bridge to map to an incoming region of a local memory assigned to an external computing node and to map to an outgoing region of the local memory assigned to an external computing node;

a database that utilizes the reflective memory bridge to maintain k-safety by reflecting at least part of a projection being written to a mirror node; and a monitoring circuit to monitor that an interconnect between the computing node and the external node is operable by tracking a number of writes from the outgoing region that are still in a buffer, wherein a same counter is incremented when a write is monitored from the outgoing region and is decremented when the write is released from the buffer.

18. The computing node of claim 17, wherein the reflective memory bridge specifies for the outgoing region: a name, addresses associated with the outgoing region, and a set of external computing nodes that are to receive updates to the outgoing region, and wherein the reflective memory bridge specifies for the incoming region: a name, addresses associated with the incoming region, and a set of external computing nodes that are to reflect to the incoming region.

19. The computing node of claim 17, further comprising a memory mapped interface that allows remote read/exchange constructs or remote read/increment constructs.

20. The computing node of claim 17, wherein the memory mapped interface further transmits a timeout or error notification to an interconnect controller when the outgoing region or the incoming region is determined to be unavailable.

* * * * *